Aug. 27, 1940.　　　　　A. J. PARENT　　　　　2,213,015
KITCHEN TOOL
Filed May 12, 1939
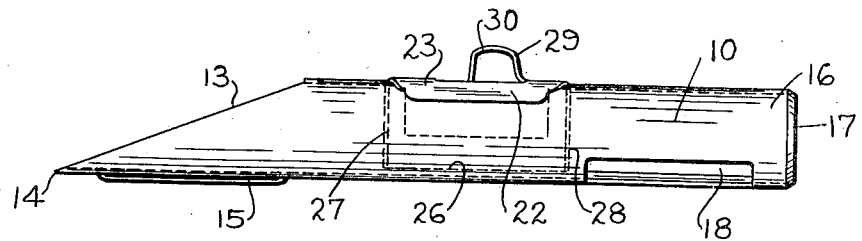
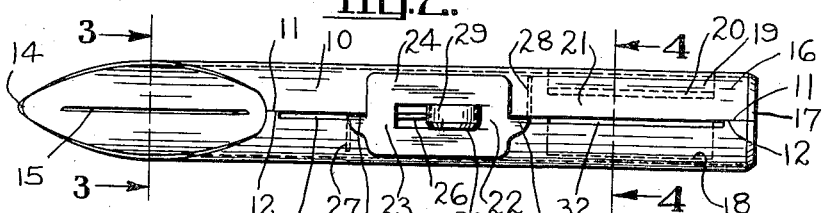
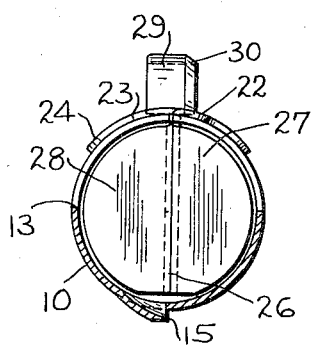 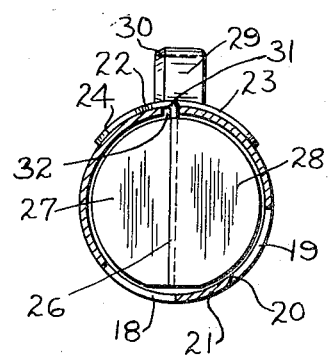
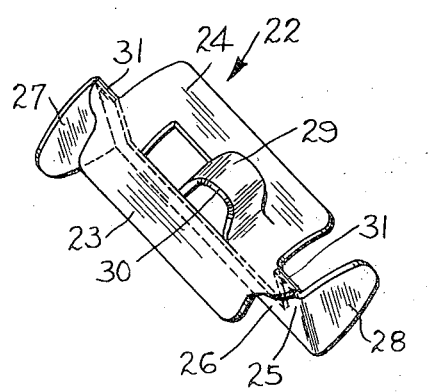
INVENTOR
*Albert J. Parent.*
BY
*H. G. Manning*
ATTORNEY Patented Aug. 27, 1940

2,213,015

UNITED STATES PATENT OFFICE 2,213,015

KITCHEN TOOL

Albert J. Parent, Waterbury, Conn.

Application May 12, 1939, Serial No. 273,176

7 Claims. (Cl. 30—130)

This invention relates to kitchen utensils, and more particularly to a combination tool adapted for use in coring, peeling, and slicing fruits and vegetables.

One object of this invention is to provide a kitchen utensil of the above nature with improved means for coring fruits, such as apples and citrus fruits, and to eject the removed cores therefrom.

A further object is to provide a kitchen utensil of the above nature which will be tubular in form and be provided with coring means at each end thereof, and having a double-acting core-ejector adapted for use in ejecting cores from either end thereof.

A still further object of this invention is to provide an improved kitchen utensil of the above nature which will be relatively inexpensive to manufacture, easy to clean and to keep in a sanitary condition, simple in construction, compact, ornamental in appearance, and very efficient and durable in use.

With these and other objects in view, which will appear as the description proceeds, there has been illustrated in the accompanying drawing, one form in which the invention may be conveniently embodied in practice.

In the drawing:

Fig. 1 is a side view of a kitchen utensil embodying the features and principles of this invention.

Fig. 2 is a top plan view of the same.

Fig. 3 is an enlarged cross-sectional view taken on the line 3—3 of Fig. 2.

Fig. 4 is an enlarged cross-sectional view, taken on the line 4—4 of Fig. 2.

Fig. 5 is a perspective view of the slidable core-ejector member.

Referring now to the drawing, wherein like reference numerals denote like parts throughout the several views, the numeral 10 designates a cylindrical tube formed by rolling a flat stamped sheet of metal, preferably constructed of stainless steel of the proper shape into tubular form, with edges 11 and 12 abutting at its top surface. One end of the tube 10 is cut away on an angle to produce an elliptical bevel 13, the end 14 of which is sharpened to facilitate cutting into a fruit, such as an apple, when it is desired to remove the core thereof.

The sharpened point 14 may also be used to remove eyes and "spots" from potatoes and other vegetables or fruits.

Directly below the pointed end 14, opposite the bevel 13, the tube 10 is provided with an offset sharpened knife edge 15 adapted for use in removing the skins, or "peeling" fruits and vegetables.

The other end 16 of the tube 10 is made circular and sharpened about its edge 17 to facilitate the cutting of a core from a citrous fruit,—a pair of spaced-apart parallel open slots 18 and 19 being formed in the tube adjacent its circular end 16 to permit the escape of juice from the tube 10. One edge 20 of the longitudinal bar 21, between the slots 18 and 19, is sharpened to provide additional "peeling" means for fruits and vegetables.

Core ejector

The improved core ejector of this invention comprises a sheet metal member 22 formed in one piece and assembled upon the tube 10 by bending up from an originally flat blank. The ejector member 22 has an arcuate body portion 23 curved to fit the outer periphery of the tube upon which it is slidably disposed. Connected to the body portion 23 is a second opposed arcuate portion 24, preferably formed by cutting from an open loop of material 25 embracing the portions 23 and 24, said open loop 25 being bent downwardly substantially on the center line of the body portion 23 and at right-angles thereto to form a depending interior partition 26.

Provision is also made of a pair of substantially semi-circular parallel ears 27 and 28 formed one at each end of the partition 26, and being bent at right-angles thereto in opposite directions. A semi-loop-shaped handle 29 is also struck up from the material at the central part of the body portion 23. One edge 30 of the handle 29 is sharpened to facilitate the cutting up of vegetables into "shoe strings" and the like.

The core-ejector is preferably assembled to the tube 10 by inserting an upper edge 31 of one end of the partition 26 between the abutting side edges 11 and 12 and into an elongated widened slot 32 formed by cutting away part of one of said abutting edges, in this instance, the edge 12.

Operation

When the utensil of this invention is used for "coring" an apple or like fruit, the sharpened point 14 will be inserted into the fruit as far as necessary,—the tool then being twisted to free the core from the fruit. The core may then be easily removed by manually sliding the ejector toward the point 14 by manipulating the handle 29, which causes the ear 27 to engage the core and push it out of the tube 10

When it is desired to remove the core from a citrus fruit, the opposite circular end 16 of the tool will be pushed into the fruit with a twisting action. The core may then be removed from the tool by manually pushing the ejector toward the end 16, causing the ear 28 to engage the core and push it out of the tube 10.

One advantage of this invention is that fruits and vegetables may be readily peeled with the combination tool by moving either of the knife edges 15 or 20 about the periphery of the same, using the tube 10 as a handle.

It will be understood that peelings will drop out of the elliptical opening 14 or slots 18 and 19, or may be quickly removed by the manipulation of the core-ejector as above described.

It will also be understood that fruits or vegetables may be readily sliced by means of the sharpened edge 20 of the central bar 21, the slots 18 and 19 being of sufficient width to permit relatively thick slices to be made. Slicings may be ejected from the end 16 of the tube by manipulation of the ejector as above described.

A further use which may be made of this tool is to cut vegetables into relatively long thin strips or "shoe strings." This may be easily accomplished by means of the sharpened edge 30 of the handle 29.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to obtain Letters Patent, is:

1. In a kitchen utensil, a tubular handle having fruit core removing means at each end thereof, and a slidable double-acting core-ejector member mounted in said handle and adapted to selectively engage and remove said core from either end of said handle.

2. In a kitchen utensil, a cylindrical handle having means at each end thereof to cut a core from a fruit, a core ejector slidably mounted in said handle, said ejector having transverse ears at both ends to engage a core at either end of said handle for removing it therefrom.

3. In a kitchen utensil, a tubular body member, a fruit core ejector adapted to be mounted in said body member, said ejector comprising a body portion embracing a portion of the exterior of said tubular body member and having a pair of transverse core-ejecting semi-circular ears at the ends of said body portion located within said utensil.

4. A fruit core ejector adapted to be mounted in a tubular kitchen utensil, said ejector comprising a body portion adapted to rest on the exterior of said tubular utensil and having a pair of parallel semi-circular transverse core-ejecting ears connected with said body portion and located within said utensil, and a looped handle extending upwardly from said body portion, one edge of said looped handle being sharpened for use in cutting a vegetable into "shoe string" strips.

5. A kitchen utensil comprising a tubular handle having a sharpened elliptical bevel at one end and a sharpened circular cutting section at its other end, a core ejector having an interior guiding section located within said handle and a body portion slidably mounted upon the exterior of said tubular body and having transverse ears at the ends thereof adapted to engage a core and push it out of said tubular body when the ejector is manually moved in either direction.

6. A kitchen utensil comprising a tubular handle having a sharpened elliptical bevel at one end and a sharpened circular cutting section at the other end, a slidable core ejector having guiding means located within said handle and having a body portion located outside said handle, said ejector having a pair of transverse ears within said handle, one at each end of said ejector, and a looped handle extending upwardly from said ejector body portion, one edge of said looped handle being sharpened for use in cutting a vegetable into elongated "shoe string" strips.

7. In a kitchen utensil, a tubular cutter for coring vegetables and fruits, a double-acting core-ejector slidably mounted in said cutter and having means on the opposite ends thereof to engage and remove a core from either end of said cutter.

ALBERT J. PARENT.